United States Patent [19]

Hunger

[11] Patent Number: 4,686,287

[45] Date of Patent: Aug. 11, 1987

[54] DISAZO COMPOUNDS DERIVED FROM ACETOACETYLAMINO-BENZIMIDAZOL-2-ONES

[75] Inventor: Klaus Hunger, Kelkheim, Fed. Rep. of Germany

[73] Assignee: Hoechst Aktiengesellschaft, Fed. Rep. of Germany

[21] Appl. No.: 719,255

[22] Filed: Apr. 3, 1985

[30] Foreign Application Priority Data

Apr. 5, 1984 [DE] Fed. Rep. of Germany ....... 3412730

[51] Int. Cl.[4] ................... C09B 31/10; C09B 35/035; C09B 67/48; D06P 1/44
[52] U.S. Cl. ................... 534/742; 534/575; 534/581; 534/600; 534/887
[58] Field of Search ................... 534/742, 575, 887

[56] References Cited

U.S. PATENT DOCUMENTS

| | | | |
|---|---|---|---|
| 3,828,019 | 8/1974 | Junker et al. | 534/742 |
| 4,169,091 | 9/1979 | Kuhne et al. | 534/742 X |
| 4,169,830 | 10/1979 | Hunger | 534/742 |

FOREIGN PATENT DOCUMENTS

| | | | |
|---|---|---|---|
| 2232524 | 1/1973 | Fed. Rep. of Germany | 534/742 |
| 2451097 | 5/1975 | Fed. Rep. of Germany | 534/742 |
| 848290 | 10/1939 | France | 534/742 |
| 57-21460 | 4/1982 | Japan | 534/742 |
| 784781 | 10/1957 | United Kingdom | 534/742 |
| 1370543 | 10/1974 | United Kingdom | 534/742 |

*Primary Examiner*—Floyd D. Higel
*Attorney, Agent, or Firm*—Connolly and Hutz

[57] ABSTRACT

Disazo compounds of the formula I

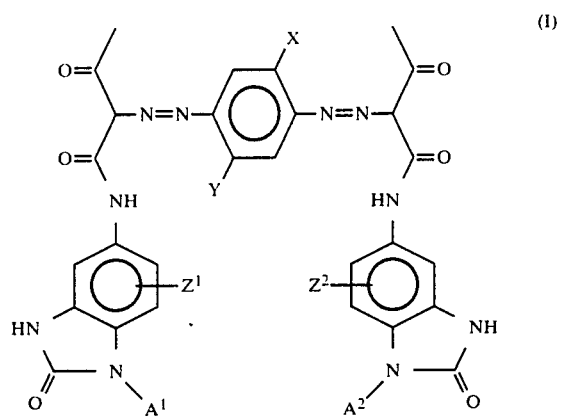

in which X and Y are identical or different and denote hydrogen, bromine, chlorine, methyl, methoxy, ethoxy, nitro, trifluoromethyl, carbomethoxy or carboethoxy, $A^1$ and $A^2$, independently of each other, represent hydrogen, methyl or ethyl and $Z^1$ and $Z^2$ in the 6- or 7-position of the heteroaromatic ring system, independently of each other, represent hydrogen, bromine, chlorine, methyl, methoxy, ethoxy, carbomethoxy, carboethoxy or nitro, are obtained by coupling a monodiazotized p-diaminobenzene substituted by X and Y analogously to the formula I with a 5-acetoacetylaminobenzimidazolone which carries the radicals $A^1$ and $Z^2$ analogously to the formula I, and reacting the resulting aminoazo compound after another diazotization with a 5-acetoacetylaminobenzimidazolone which carries the radicals $A^2$ and $Z^2$ analogously to the formula I, to give the disazo compound of the formula I. The crude product is subsequently thermally aftertreated at 80° to 200° C.

In the case where X, Y or $Z^1$ does not denote a nitro group, it is possible to use as an alternative to the p-diaminobenzene derivative a corresponding p-aminonitrobenzene derivative. In this case, analogous diazotization and coupling is followed by reduction of the resulting nitroazo compound to the aminoazo compound, which is converted into the compound of the formula I as described above.

The symmetrical or asymmetrical disazo compounds of the formula (I) are obtained in a particle size of ≦0.25 μm and are suitable for use as pigments in printing inks, lakes and emulsion paints, for coloring plastics, rubber, natural and synthetic resins or spinning compositions and for pigment printing on, for example, textile fiber materials and paper. The pigments are tinctorially very strong and have very high solvent, migration, light and weathering fastness properties and a high thermostability.

9 Claims, No Drawings

DISAZO COMPOUNDS DERIVED FROM ACETOACETYLAMINO-BENZIMIDAZOL-2-ONES

The invention relates to disazo compounds, in particular disazo pigments, and to their preparation. For example, the method of preparation can be used to prepare not only symmetrical but also asymmetrical disazo compounds.

German Offenlegungsschrift No. 2,232,524 (GB-A-1,370,543) describes disazo pigments where 1,4-phenylenediamine is the bisdiazo component and acetoacetarylides and pyrazolones are the coupling components. These disazo pigments are prepared by treating one mole of diamine with two moles of an enolized or enolizable ketomethylene compound in an organic solvent in the presence of nitrous acid or esters thereof. Owing to their method of preparation, in which both amino groups are diazotized, these disazo pigments always have a symmetrical structure, so that two identical radicals of the coupling components are present on the 1,4-phenylenediamine radical. The disadvantage is that, in the known process, the compounds are obtained in inadequate yields and, what is more, in a particle size which is generally unsuitable for use as pigment. Moreover, the known disazo compounds are inadequate in their properties, in particular in hiding power and gloss, but also in migration fastness, light fastness and thermosability. For that reason, their use in, for example, coloring plastics, in particular polyvinyl chloride or polyolefins, or paints is subject to restrictions. There has been a long-felt want for these fastness properties to be improved, so that these kind of pigments can be used universally.

The invention provides a process for preparing compounds of the formula I

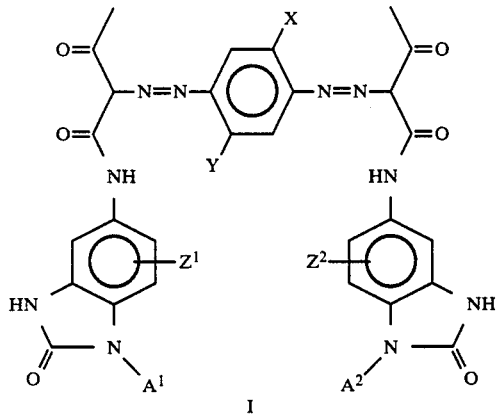

(I)

in which X and Y are identical or different and denote hydrogen, bromine or chlorine or a methyl, methoxy, ethoxy, nitro, trifluoromethyl, carbomethoxy or carboethoxy group, $A^1$ and $A^2$ each represent hydrogen or a methyl or ethyl group, and $Z^1$ and $Z^2$ in the 6- or 7-position of the heteroaromatic ring system each represent hydrogen, bromine or chlorine, or a methyl, methoxy, ethoxy, carbomethoxy, carboethoxy or nitro group, which comprises taking compounds of the formula II

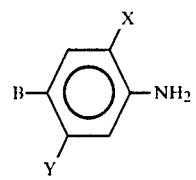

(II)

in which B is an amino or nitro group and X and Y are identical or different and as defined above, and (a) in the case where B is an amino group, monodiazotizing these 1,4-diaminobenzenes in an aqueous medium and coupling the diazonium salt with a 5-acetoacetylaminobenzimidazole compound of the formula III

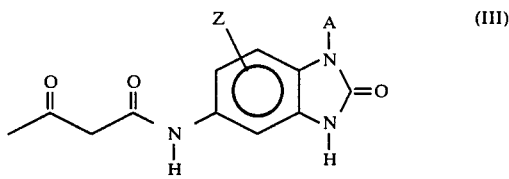

(III)

in which A and Z each have the meaning indicated above for $A^1$ and $A^2$ or $Z^1$ and $Z^2$ respectively, to give the aminoazo compound of the formula IV

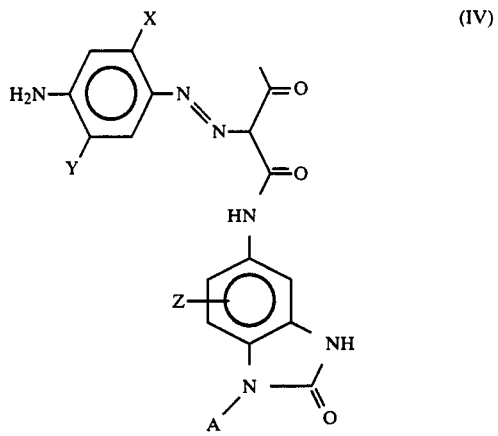

(IV)

or (b) in the case where B is a nitro group and X and Y are as defined above but do not represent nitro substituents, diazotizing this 4-nitroaniline and coupling the diazonium compound onto a benzimidazolone derivative of the formula III where A and Z are as defined above but do not represent nitro substituents, and then reducing the resulting nitroazo compound of the formula V

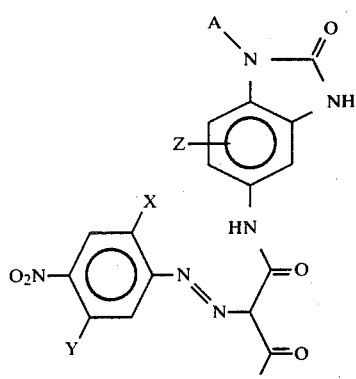

(V)

to the aminoazo compound of the formula IV and (c) diazotizing the respectively resulting aminoazo compounds of the formula IV once more and coupling the diazonium compound onto an identically or differently substituted compound of the formula III and working up the resulting reaction product in a conventional manner and then subjecting it to a thermal after-treatment at 80° to 200° C.

Since in both methods the aminoazo compound is the first product obtained, it can be used to prepare in a controlled manner in respect of the coupling component symmetrical and also asymmetrical disazo compounds.

The invention also provides novel disazo compounds of the formula I in which X, $A^1$, $A^2$, $Z^1$ and $Z^2$ are as already defined and Y represents a hydrogen atom or a methyl, methoxy, ethoxy, nitro, carbomethoxy or carboethoxy group. These compounds are preferably prepared in a particle size of $\leq 0.25$ μm.

The invention also provides disazo compounds of the formula I in which X, $A^1$, $A^2$, $Z^1$ and $Z^2$ are as already defined, but Y is chlorine or bromine, and which, in their preparation, are obtained in a particle size of $\leq 0.25$ μm.

The process according to the invention is distinguished not only by the fact that very high yields are obtained but also in particular by the fact that it provides disazo compounds which are markedly superior to the state of the art compounds in particle size and particle size distribution. For instance, on reworking tabular Examples 19 and 20 of German Offenlegungsschrift No. 2,232,524 compounds were obtained at particles which on average were about 780 to 1580 times bigger than the mean particle size of the compounds according to the invention whose maximum particle size, as measured by electronmicroscopy, does not exceed 0.25 μm.

The compounds of German Offenlegungsschrift No. 2,232,524 are utterly unsuitable for use as pigments, since the coarsely crystalline particles can only be reduced in size using conventional methods at great expense, if at all.

The monodiazotization of ring-halogenated 1,4-diaminobenzenes is known from German Pat. No. 586,355. In said process, the compounds are diazotized at one position with the amount of mineral acid and nitrous acid required for the diazotization of one amino group, and the resulting diazo compounds are precipitated in solid form by adding salt.

The monodiazotization of 1,4-diaminobenzenes of the formula II can also be effected, for example, in accordance with German Offenlegungsschrift No. 2,555,515, by diazotizing the 1,4-diaminobenzene in question in water or in a mixture of water and a water-miscible solvent, for example methanol, ethanol, acetone, dioxane, formamide, dimethylformamide, dimethyl sulfoxide, tetrahydrofuran, ethylene glycol, diethylene glycol dimethyl ether and/or N-methylpyrrolidone, within the pH range from 1 to 4, preferably 1.5 to 3.5, in the presence of mineral acids, for example sulfuric acid or phosphoric acid, in particular of hydrohalic acids, such as hydrochloric acid, or in the presence of low-molecular organic acids, for example oxalic acid or chloroacetic acid, in particular acetic acid, or in the presence of a mixture of a mineral acid with a low-molecular organic acid, for example a mixture of phosphoric acid and propionic acid, or hydrochloric acid and acetic acid, or sulfuric acid and acetic acid.

The diazotization of the 4-nitroanilines of the formula II or of the aminoazo compounds of the formula IV can be effected, for example, with alkali metal nitrites or lower alkyl nitrites of 1 to 5 carbon atoms in the alkyl group in the presence of sufficiently strong acids, in particular a mineral acid such as sulfuric acid or hydrochloric acid, or even nitrosylsulfuric acid.

The temperature for the diazotization can vary within a wide range, for example from $-10°$ to $+30°$ C. However, the preferred diazotization temperature is 0° to $+5°$ C.

The time for the diazotization can also be varied widely. In general, 5 to 120 minutes are needed.

In the diazotization and/or the subsequent coupling, it can be of advantage, for example for obtaining a favorable particle size distribution and/or for affecting the rate of reaction, to add surface-active agents, for example nonionic, anionic or cationic dispersants.

Examples of these surface-active agents are anionic substances such as fatty acid taurides, fatty acid N-methyltaurides, fatty acid isethionates, alkylbenzenesulfonates, alkylnaphthalenesulfonates, alkylphenol polyglycol ether sulfates and fatty alcohol polyglycol ether sulfates, fatty acids, for example palmitic acid, stearic acid and oleic acid, soaps, for example alkali metal salts of fatty acids, naphthenic acid and resin acids, for example abietic acid, alkali-solution resins, for example colophony-modified maleate resins, cationic substances, such as quaternary ammonium salts, N-oxides of tertiary amines or their salts, fatty amines and their ethoxylated derivatives, and nonionic substances such as fatty alcohol polyglycol ethers (ethoxylated fatty alcohols), fatty acid polyglycol esters, alkylphenol polyglycol ethers and dialkyl polyglycol ethers.

The surface-active agents can be added either alone or mixed. The amount can vary within wide limits, the quantity which is generally used being 0.1 to 20% by weight, preferably 5 to 10% by weight, relative to a 100% pigment yield.

It is advantageous to proceed with the coupling by dissolving the coupling component, preferably in aqueous alkali metal hydroxide solution, reprecipitating with acid and, finally, using the resulting suspension to carry out the coupling at 10 to 80, preferably 15 to 35, °C.

The coupling can also be carried out in the presence of organic solvents, for example glacial acetic acid, lower alkanols, dioxane, formamide, dimethylformamide, dimethyl sulfoxide, pyridine or N-methylpyrrolidone.

The reduction of the nitroazo compounds of the formula IV, which, owing to their structures, have stable azo bridges, is generally effected by conventional methods, for example by reduction with iron or hydrosulfide or other reducing agents or catalytically with hydrogen. Suitable solvents in which to carry out the reduction are, in addition to water, all organic solvents which are inert to reductions, for example alkanols, aprotic solvents, such as dimethylformamide, dimethyl sulfoxide, N-methylpyrrolidone, aromatic hydrocarbons, such as toluene and the various xylenes.

After the reduction has been carried out catalytically, for example with hydrogen/Raney nickel, the mixture is filtered to remove the solvent, the aminoazo compound is stirred at room temperature with aqueous hydrochloric acid until the metallic nickel has been converted into nickel chloride, and the solids left are then filtered off, are washed until salt-free and neutral, and are dried. In cases where the aminoazo compound is soluble in the solvents, the catalyst is filtered off after the reduction and the aminoazo compound is isolated.

To develop the full tinctorial strength, it is frequently advisable to heat the reaction product after the second coupling for some time, for example under reflux conditions or under pressure at temperatures above 100° C., in the absence or presence of organic solvents, such as lower alkanols, for example ethanol or isobutanol, halogenated aromatic hydrocarbons, such as chlorobenzene or the various dichlorobenzenes, for example o-dichlorobenzene, and dimethylformamide, N-methylpyrrolidone, dimethyl sulfoxide or in the presence of resin soap.

Particularly pure, readily dispersible and tinctorially strong pigments are obtained with the products according to the invention on subjecting after the coupling the moist press cakes or the dried powders to a thermal aftertreatment at 80° to 200° C., preferably 120° to 160° C., in an aqueous suspension, if desired in or in the presence of organic solvents, such as alcohols, especially lower alkanols of 1 to 6 carbon atoms, pyridine, glacial acetic acid, dimethylformamide, N-methylpyrrolidone, dimethyl sulfoxide, halogenated aromatic hydrocarbons, such as chlorobenzene or dichlorobenzenes, for example o-dichlorobenzene, or nitrobenzene and/or subsequently milling the pigments in the presence of milling aids.

The pigments can also be prepared in the presence of a carrier material, for example baryte.

The compounds according to the invention are insoluble in water and in customary organic solvents and are suitable in finely divided form for pigmenting high molecular weight organic material, irrespective of whether this material is present in the form of plastic compositions, melts or in the form of spinning solutions, paints or printing inks. They can be used for pigmenting, i.e. coloring, printing inks, lakes and emulsion paints and other materials, for example paper, cellulose ethers and esters, nylons, polyurethanes, polyacrylonitriles, polyesters, such as polyglycol terephthalate, viscose, acetylcellulose, nitrocellulose, natural or synthetic resins, for example amino resins, in particular urea- and melamine-formaldehyde resins, alkyd resins, acrylate resins, phenolic resins, polycarbonates, polystyrene, polyvinyl chloride, polyolefins, such as polyethylene and polypropylene, and polyacrylates, rubber, casein, silicone and silicone resins. They are also suitable for pigment printing on substrates, in particular textile fiber materials, or other sheetlike structures, such as, for example, paper.

The pigments are tinctorially very strong, have a particle size of $\leq 0.25$ μm, are remarkably resistant to the action of chemicals, especially solvents, and have satisfactory migration fastness properties, high thermostability and very good light and weathering fastness properties.

In the following examples, the percentages are by weight.

EXAMPLES (1a)

10.8 g of 1,4-diaminobenzene were dissolved in 100 ml of water and 40 ml of 5N hydrochloric acid, and the solution was cooled down to 5° C. 50.3 ml of 2N sodium nitrite solution were added dropwise in the course of one hour. In the course of the addition the pH rose from 2 to 3.5, and at the end of the addition a slight nitrite excess was observed. The mixture was left to cool for 30 minutes, and the batch was clarified with charcoal and kieselguhr.

24 g of 5-acetoacetylaminobenzimidazolone were dissolved in a mixture of 18 ml of 33% strength sodium hydroxide solution and 300 ml of water. The solution was brought to pH 9 by the dropwise addition of 10.5 ml of glacial acetic acid in 100 ml of water, and all of the coupling component came down as precipitate. The precipitate had added to it dropwise the solution of the diazo component in the course of 30 minutes, during which pH 9 was maintained by alternately adding a total of 200 ml of a 3% strength sodium carbonate solution. After the coupling reaction had ended, the mixture was brought to pH 7 with dilute (2% strength) hydrochloric acid and was heated at 95° C. for 30 minutes. The orange-colored precipitate was filtered off, was washed until salt-free and was dried, to leave 30.3 g (86.1% of theory) of an orange-colored powder of the formula

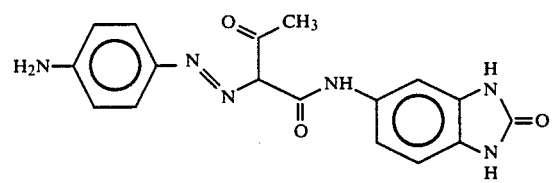

having a melting point of 288° C.

(1b)

17.6 g of the 4-aminophenylazo compound of Example 1a were stirred in 100 ml of glacial acetic acid and 20 ml of 31% strength hydrochloric acid for one hour. At Zb 10° C., 10 ml of 5N sodium nitrite solution were added dropwise, and the mixture was stirred in the presence of a slight excess of nitrite for one hour, 500 ml of ice-water were added, and the diazonium salt solution went into solution. The excess nitrite was destroyed with a little sulfamic acid.

12 g of 5-acetoacetylaminobenzimidazolone were dissolved in a mixture of 200 ml of water and 10 ml of 33% strength sodium hydroxide solution. This solution was added to 200 ml of ice-water and 600 ml of glacial acetic acid, and the coupling component again came down as precipitate. Afterwards the mixture was brought to pH 5 with 50 ml of 4N sodium acetate solution.

The resulting diazonium salt solution was then added dropwise to the precipitated coupling component in the course of one hour, and after the addition was complete the mixture was stirred at room temperature for a further two hours and at 90° for one hour. In the course of the stirring, the initially reddish brown pigment turned orange-colored. The pigment was then filtered off with suction, was washed until salt-free and was dried. Yield 26.5 g (88.9% of theory) hue 5 (C.I. hue indication chart). The crude pigment was treated at 180° C. in 350 ml of dimethyl sulfoxide for 3 hours, was filtered off with suction, was washed with methanol, and was dried. The resulting, tinctorially very strong pigment of the formula I in which X, Y, $A^1$, $A^2$, $Z^1$ and $Z^2$ are hydrogen atoms can be processed into extremely migration-fast printing inks, paints and plastics in orange shades.

(2a)

The 4-aminophenylazo compound prepared in Example (1a) was also synthesized as follows: 50 g of the 4-nitrophenylazo compound obtained by coupling diazotized 4-nitroaniline onto 5-acetoacetylaminobenzimidazolone were hydrogenated at 80° C. in 500 ml of N-methylpyrrolidone with 3 g of Raney nickel and 50 bar of hydrogen pressure. The orange-colored suspension was then diluted with N-methylpyrrolidone to a volume of 3 liters and was heated at 100° C. until a clear solution had formed, and the nickel catalyst was filtered off. The filtrate was concentrated at 80°–100° C. under reduced pressure to a volume of about 1 liter, and the orange-colored product was filtered off with suction, was washed with ethanol and was dried. Yield 43.7 g (94.9% of theory); melting point 288° C.

In place of N-methylpyrrolidone it is also possible to use other solvents, for example dimethylformamide. After the hydrogenation it is also possible to filter off the aminoazo compound, stir with water and hydrochloric acid until the nickel catalyst has been destroyed, and then filter and wash until nickel-free.

(2b)

The resulting 4-aminophenylazo compound was diazotized as in Example (1b) and again coupled onto 5-acetoacetylaminobenzimidazolone, the product being the disazo pigment of Example (1b).

Further disazo compounds which can be prepared using the methods according to the invention are cited as examples in the following table:

| | | | (Designations relate to the formula I): | | | | | |
|---|---|---|---|---|---|---|---|---|
| Ex. | X | Y | $A^1$ | $Z^1$ | $A^2$ | $Z^2$ | Hue | C.I. |
| 3 | H | H | H | H | $CH_3$ | H | yellowish orange | 4 |
| 4 | H | $CH_3$ | H | H | H | H | orange | 5 |
| 5 | H | Cl | H | H | H | H | orange | 5 |
| 6 | H | $OCH_3$ | H | H | H | H | reddish orange | 6 |
| 7 | $CH_3$ | $CH_3$ | H | H | H | H | reddish orange | 6 |
| 8 | Cl | Cl | H | H | $CH_3$ | H | yellowish orange | 4 |
| 9 | H | $COOH_3$ | H | H | H | H | orange | 5 |
| 10 | H | $CF_3$ | H | H | H | H | reddish orange | 3 |
| 11 | H | H | H | Cl | H | Cl | yellowish orange | 4 |
| 12 | $OCH_3$ | $OCH_3$ | H | H | H | H | violet | 12 |
| 13 | H | Cl | H | 6-Cl | H | 6-Cl | reddish orange | 6 |
| 14 | H | Cl | $CH_3$ | H | $CH_3$ | H | reddish orange | 6 |
| 15 | H | Cl | H | 7-Cl | H | 7-Cl | reddish orange | 6 |
| 16 | H | Cl | H | 6-$OCH_3$ | H | 6-$OCH_3$ | orange | 5 |
| 17 | H | Cl | H | 7-$CH_3$ | H | 7-$CH_3$ | orange | 5 |
| 18 | H | Cl | H | 6-$CH_3$ | H | 6-$CH_3$ | reddish orange | 6 |
| 19 | H | $NO_2$ | H | H | H | H | reddish orange | 6 |
| 20 | H | Cl | H | 6-$COOCH_3$ | H | 6-$COOCH_3$ | yellowish orange | 4 |
| 21 | Cl | Cl | H | H | H | H | yellowish orange | 4 |
| 22 | Cl | Cl | $CH_3$ | H | $CH_3$ | H | yellowish orange | 4 |

C.I. = Hue as in C.I. hue indication chart.

I claim:

1. A disazo compound of the formula I

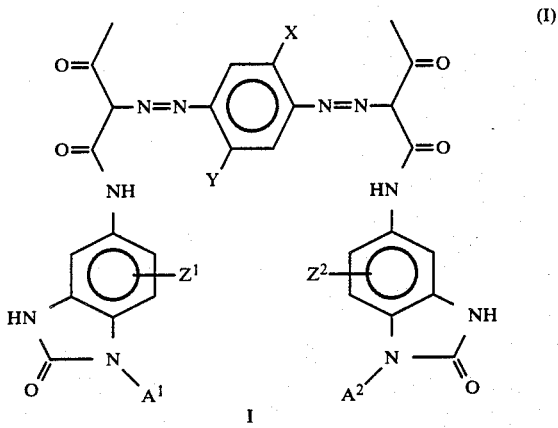

in which X is hydrogen, bromine or chlorine or methyl, methoxy, ethoxy, nitro, trifluoromethyl, carbomethoxy or carboethoxy, Y is hydrogen, methyl, methoxy, ethoxy, nitro, trifluoromethyl, carbomethoxy, or carboethoxy, $A^1$ and $A^2$ each represent hydrogen or methyl or ethyl, and $Z^1$ and $Z^2$ in the 6- or 7-position of the heteroaromatic ring system each represent hydrogen, bromine or chlorine, methyl, methoxy, ethoxy, carbomethoxy, carboethoxy or nitro.

2. A disazo compound of formula I of claim 1 in which X, Y, $A^1$, $A^2$, $Z^1$ and $Z^2$ are hydrogen.

3. A disazo compound of the formula I of claim 1 in which X is chlorine and Y, $A^1$, $A^2$, $Z^1$ and $Z^2$ are hydrogen.

4. A disazo compound of the formula I of claim 1 in which X and Y are methyl and $A^1$, $A^2$, $Z^1$ and $Z^2$ are hydrogen.

5. A disazo compound of the formula I of claim 1 in which X, Y, $A^1$, $Z^1$ and $Z^2$ are hydrogen and $A^2$ is methyl.

6. A disazo compound of the formula I of claim 1 in which X is chlorine, Y, $A^1$ and $A^2$ are hydrogen and $Z^1$ and $Z^2$ are chlorine in the 7-position.

7. A disazo compound of the formula I of claim 1 in which X is chlorine, Y, $A^1$ and $A^2$ are hydrogen and $Z^1$ and $Z^2$ are methoxy in the 6-position.

8. A disazo compound as claimed in claim 1 which, after its preparation, has a particle size, as measured by electronmicroscopy, of $\leq 0.25$ μm.

9. A disazo compound of the formula I of claim 1 in which Y is chlorine or bromine and which, after its preparation, has a particle size, as measured by electronmicroscopy, of $\leq 0.25$ μm.

* * * * *